United States Patent [19]
Issa

[11] Patent Number: 5,945,936
[45] Date of Patent: Aug. 31, 1999

[54] LEARN MODE FOR REMOTE TRANSMITTERS

[76] Inventor: Darrell Issa, 2560 Progress St., Vista, Calif. 92083

[21] Appl. No.: 08/734,040

[22] Filed: Oct. 18, 1996

[51] Int. Cl.⁶ .................................................. H04L 17/02
[52] U.S. Cl. ........................ 341/176; 341/173; 340/426; 340/825.31; 340/825.72; 340/825.22; 307/10
[58] Field of Search ..................................... 341/176, 173; 340/825.67, 825.72, 825.31, 825.22, 426; 307/10

[56] References Cited

U.S. PATENT DOCUMENTS

| | | | |
|---|---|---|---|
| 5,049,867 | 9/1991 | Stouffer | 340/426 |
| 5,146,215 | 9/1992 | Drori | 340/825.32 |
| 5,646,701 | 7/1997 | Duckworth | 340/825.69 |
| 5,686,903 | 11/1997 | Duckworth | 340/825.69 |

*Primary Examiner*—Michael Horabik
*Assistant Examiner*—Albert K. Wong
*Attorney, Agent, or Firm*—Sam Talpalatsky, Esq.

[57] ABSTRACT

A remotely controllable vehicle system for generating a response to an incoming threat to a secured area and/or control of user selectable convenience features, comprising a wireless transmitter having at least one switch for generating and transmitting a signal encoded with a code word having at least one identification word; a receiver for receiving the signal; a decoder for decoding the code word from the signal; a controller responsive to a command word embedded in the code word only if an identification word, embedded in the code word, is identical to at least one authorized identification word stored in a memory accessible to the controller; a learn mode for programming a new identification word of a new transmitter in the memory as an authorized identification word only if multiple groups of the code words are transmitted from the transmitter and received by the controller.

50 Claims, 4 Drawing Sheets

LEARN MODE FOR REMOTE TRANSMITTERS

BACKGROUND OF THE INVENTION

1. Field of the Invention

This invention relates to remotely controllable vehicle systems such as security and/or keyless entry systems, employing remote, wireless transmitters for its operation and control. More particularly, this invention discloses a novel way to program the controller of the security system to recognize a particular remote transmitter(s) as an authorized transmitter(s) in an environment subject to EMF and RF noise.

2. Description of Prior Art

Remotely controllable vehicle security systems have found a profound place in today's society. Consumers purchase these systems as a theft deterrent, as a personal shield against crime and as a convenience item for keyless entry into their vehicles. As these systems evolve, manufacturers have recognized market demand for remote transmitters capable of arming and disarming vehicle security systems and/or locking and unlocking vehicle doors. Today, virtually all such systems operate under the control of remote transmitters generating a discrete signal and controlling systems specifically tuned to respond to that signal.

The more sophisticated remote transmitters encode a specific code word into the high frequency wireless signal. The system receives the signal and decodes it into the original code word. Thereafter, it compares the received identification word therein to a set of authorized identification words stored in a memory. If the identification words match the authorized identification words, the system proceeds to respond to the command transmitted by the remote transmitter.

Originally, these systems were preset or hard-wired to respond to a specific authorized identification word embedded within or assigned to the system. If two or more users wanted to operate the same system, it required that each user have a transmitter programmed or wired to the specific authorized identification word which the system would recognize. The market did not respond to this requirement positively. Transmitters were lost and difficult to replace. Additionally if multiple authorized users were using multiple cars equipped with these systems, these users were required to carry with them multiple remote transmitters, one for each vehicle.

To overcome this problem the industry provided a learn mode wherein the system enters a learn mode/routine and accepts the transmission of a nearby remote transmitter having an identification word therein as the authorized identification word to operate it. This process is described in the U.S. Pat. No. 5,049,867. This patent discloses a learn mode/routine for a security system where the controller is set to a learn mode/routine for a period of time, such as fifteen (15) seconds, by turning on the ignition and opening a door. The controller of that system recognizes that it is commanded to its learn mode/routine by sensing the ignition on condition and the door open condition. The system must then receive a predetermined number of identical identification words during a continuous serial transmission from a transmitter having a recognizable identification word. Thereafter, this system will register the identification word sent to it as an authorized identification word for operation of the system and stores it for future use.

The system described in the aforementioned patent has drawbacks. It requires the security system to be hardwired to a number of sensors which provide the controller with the status of conditions necessary to activate the learn mode/routine. Also, these systems are generally more expensive than the two wire systems which only have power and ground (common) inputs with an integral siren. These two wire systems would be incapable of learn mode as described in this patent.

To overcome the aforementioned problem with two wire systems, the industry used the transition from power off to power on to indicate and activate the learn mode/routine. Thereafter, any signal received by the system is registered as the authorized identification word for its operation.

Present day systems are subject to false programming in an environment where there is EMF or RF radiation or interference.

This problem is commonplace about two way radios, industrial motors, television, radio antennas and the like. This problem is also apparent in the store locations where these devices are installed because a number of installers may be programming transmitters or test operating systems at the same time. Therefore, the system being programmed may learn stray signals and/or learn a remote transmitter which is not assigned to the intended vehicle.

Therefore, there remains a need for a remotely controllable vehicle system capable of being programmed for operation with a specific remote transmitter or transmitters, each transmitter having a unique identification word therefor and capable of eliminating, during its learn mode/routine, the input of stray signals and signals transmitted by other undesired remote transmitters.

SUMMARY OF THE INVENTION

The present invention provides for a remotely controllable vehicle system, such as a security or convenience system, which is controlled by at least one wireless, remote control transmitter; This system has the capability of entering into a learn mode/routine and learning one or more identification words of multiple remote transmitters. The learn mode/routine of this invention is novel because it discriminates against random, undesirable signals. It is the object of this invention to provide a learn mode/routine to prevent stray remote transmitters from being programmed into the system.

The device of the present invention employs a remote, wireless transmitter. Each transmitter is coded with a discrete or unique identification word. Upon activation of the transmitter, the identification word is encoded onto a high frequency carrier signal and is transmitted to the receiving system.

The system of the present invention employs an antenna which is coupled to a receiver. The receiver, detects and receives the high frequency carrier signal having encoded code words therein, and converts this signal into a code word encoded and transmitted by the transmitter. This code word carries the identification word of the transmitter as well as commands for execution by the system controller. Because it is undesirable to respond to just any transmitter, the commands are executed only if the identification word, embedded within the code word, is an authorized identification word. To determine whether the identification word is one of authorized identification words of the system, it is compared with authorized identification words of the system which are stored in a memory accessible to the system controller.

The system of the present invention is not manufactured with preprogrammed authorized identification words. To program the first and the subsequent authorized identification words, the system controller is placed in a learn mode/routine. The learn mode/routine is activated by either a switch dedicated for this function or by powering up the controller or by sequence of controller recognizable events. When the controller is placed in a learn mode/routine, it looks for separate, but consecutive transmissions of multiple, identical code words from a wireless transmitter. Any stray or extraneous transmitter signals are therefore disregarded. Therefore, the system does not register or store an identification word as an authorized identification word unless it is transmitted consecutively for a predetermined number of times in a predetermined fashion. Furthermore, in the preferred embodiment, transmissions from the remote transmitter must commence within a predetermined amount of time from placing the system in its learn mode/routine. It also follows that other remote transmitters, operating to arm or disarm other vehicles in the area, will not accidentally be programmed as authorized remote transmitters because they will not be activated multiple times, as required by the learn mode/routine of the present invention.

The device of the present invention stores the authorized identification word in an electrically erasable and programmable read only memory (EEPROM). Therefore, subsequent calculated or accidental power-down and power-up conditions will not effect or erase previously authorized transmitters from operating the security system.

It is therefore the object of this invention to provide a remotely controllable system for use in or about a vehicle which is capable of learning a new authorized transmitter having an identification word. It is further the object of this invention to provide a learn mode which discriminates and eliminates stray or unwanted signals or transmitters from being programmed in the system. It is an object of this invention to provide for audio and/or visual feedback to the user at each step of the learn mode. It is an object of this invention to provide for a program mode capable of efficiently erasing all or part of existing authorized transmitter codes in the event an authorized transmitter is lost or stolen. It is further the object of this invention to provide an improved and economical security system.

These and other objects of the invention may be found from a close reading of the Description of the Preferred Embodiment taken along with the drawings appended hereto. The scope of protection sought by the inventors may be gleaned from a fair reading of the claims that conclude this Specification.

DESCRIPTION OF THE PREFERRED EMBODIMENT

Figure 1:
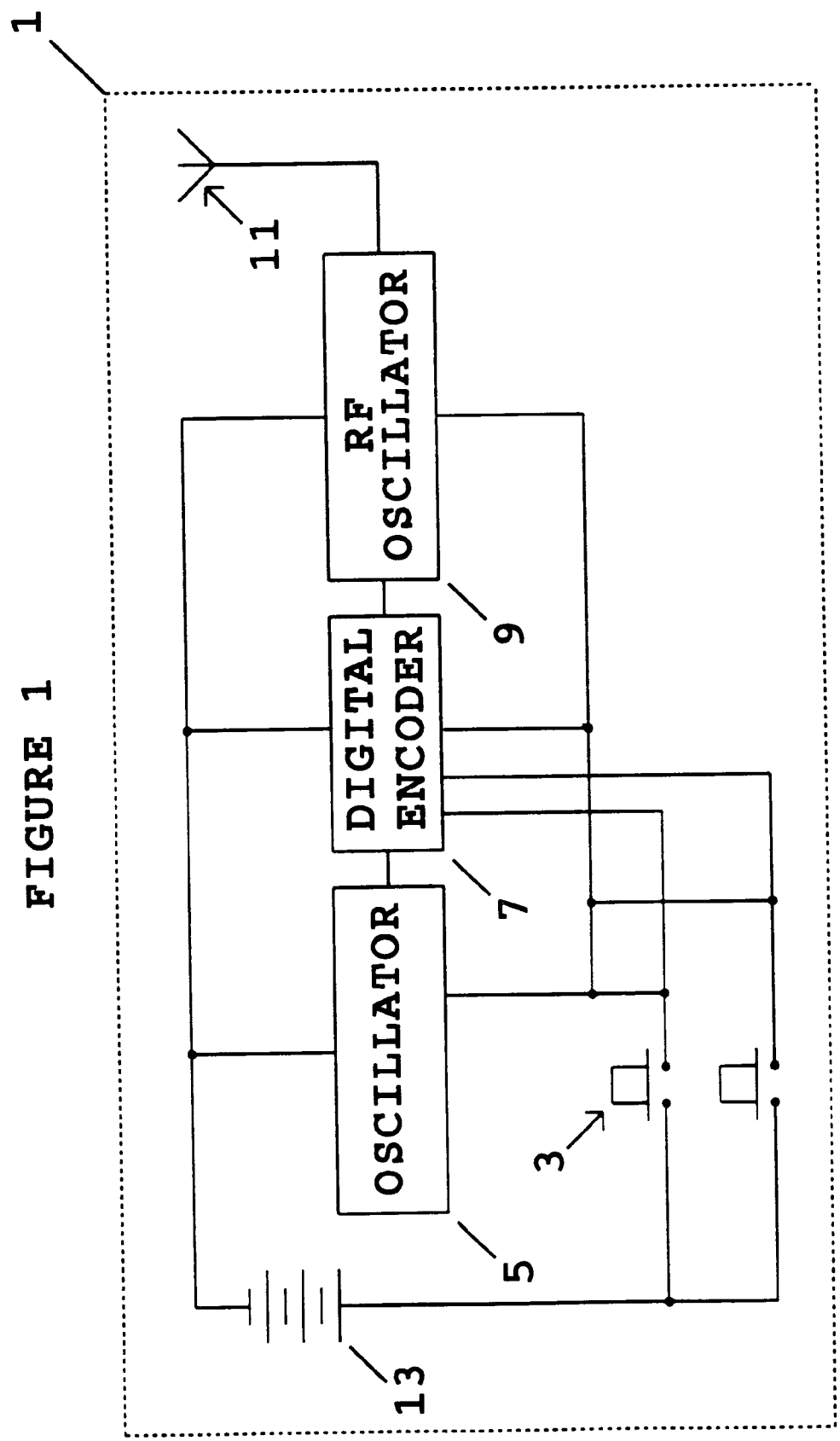
FIG. 1 is a block diagram of the remote controlled transmitter.

The preferred embodiment of the invention employs a wireless transmitter 1, shown in FIG. 1. Transmitter 1 is activated by pressing a switch 3. Switch 3, in the preferred embodiment, is at least one normally open, spring biased switch that makes contact when depressed and breaks contact when released. However, switch 3 includes any switch or switches capable of making and breaking a contact that are known in the art. In the preferred embodiment, switch 3 is at least one normally open switch that applies power to the components of transmitter 1 and/or activates the encoder output of transmitter I when depressed to make contact. Once activated, encoder 7 fetches an identification word which is unique and/or assigned to the particular transmitter 1. The identification word may be selected by the user, the installer or the manufacturer of the transmitter 1. In the preferred embodiment the identification word is unique to each transmitter 1 and is preset by the manufacturer of transmitter 1 by cutting traces (not shown), burning the word into fuse logic of encoder 7 and/or setting the word into a memory such as EEPROM (not shown).

Oscillator 5 provides the clock frequency for Encoder 7 and is usually an integral part of encoder 7 integrated circuit. Encoder 7 receives the code word and encodes it onto a high frequency signal carrier generated by RF oscillator 9 for transmission of the code word via antenna 11 to a remote system 25 which will be discussed in detail below. Again, although the preferred embodiment employs a security system, any remotely controllable system is within the scope of this invention. Code words comprise the identification word, preamble bits such as start and/or stop bits, function word and/or any other word or bits necessary and/or desirable to transmit to system 25. Security system 25 executes a function or functions depending on the function word if and only if it recognizes the code word to contain an identification word that is one of the authorized identification words to operate system 25.

The code word is transmitted via a high frequency radio carrier signal. The actual frequency of the signal carrier is often mandated by regulation agencies such as the FCC (in the United States). Various modulation techniques are readily known in the art and are used to modulate information onto the carrier signal. In the preferred embodiment of this invention, the code word is a string of pulse width coded bits (pulse width modulation); however, any type of modulation is within the scope of this invention, including amplitude and frequency modulation. The encoded signal is then used to turn on RF oscillator 9 of transmitter 1 to transmit the encoded RF signal at the radio frequency. System 25 in turn receives the signal and decodes it to regenerate the code word. Transmitter antenna 11, in the preferred embodiment, is a printed circuit board loop that is an inductor in RF oscillator 9. However, in other embodiments it may be any antenna means known in the art, including a collapsible antenna, rod or a wire. The frequency of the RF oscillator is controlled by the capacitance and inductance (printed circuit board traces and the antenna loop) of the circuit and may be further stabilized by a SAW (surface acoustical wave) resonator or other frequency stabilization components (elements of RF oscillator 9).

Figure 2:
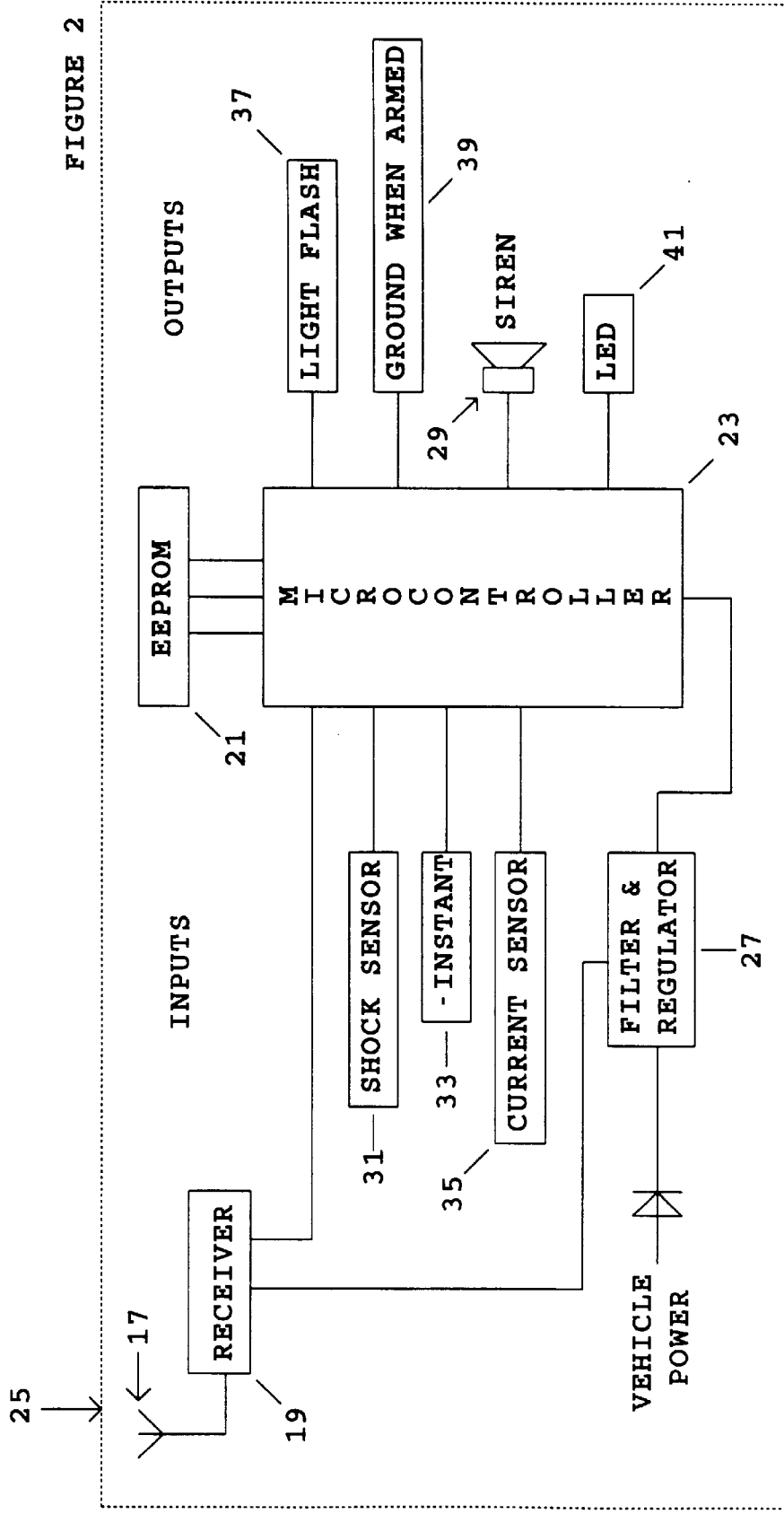
FIG. 2 is a block diagram of an auto security system.

FIG. 2 shows a block diagram of system 25. The preferred embodiment of the present invention is an auto security system 25. Vehicle power is supplied to system 25 via a reverse protection diode and regulated for system 25 usage by filter and regulator 27. The signal transmitted by transmitter 1 is sent through antenna 11 of transmitter 1 and is received by system 25 antenna 17. This signal is detected by receiver 19 and converted back into a code word which is the same code word that was assembled by encoder 7 of transmitter 1. This code word is passed to a controller 23 which extracts the identification word therefrom and compares this identification word with the authorized identification words stored in a memory, such as EEPROM 21, which is accessible or integral to controller 23. If the identification word is identical to one of the stored authorized identification words in EEPROM 21, then the command received within that code word or appended to that code word is processed and executed by controller 23.

Memory EEPROM 21, in the preferred embodiment, is an electrically erasable and programmable read only memory. This allows system 25 to respond to multiple transmitters having authorized identification words and to retain the programmed authorized identification words even in the event of a power failure. In other embodiments a static or dynamic random access memories may be employed with keep alive, backup capacitor or battery (not shown).

Controller 23 of the present invention performs a number of functions and it is responsive to commands from authorized remote transmitters 1. One of the functions is sounding of an audio device, such as a siren 29 or a vehicle horn, to provide an audio response to the executed commands. One of the commands may be to arm or disarm system 25 or to place it in a panic mode which is a full alarm state initiated remotely by the operator. Yet other commands may include locking and unlocking vehicle doors, adjustment of seat positions, window elevation, light controls, remote entry operation and other user controllable functions.

Controller 23 will not respond to commands carried by a signal which does not carry the authorized identification word. This provides for discrimination from other unauthorized transmitters in the area and discards random high frequency signals such as RF or EMF signals which stray about system 25 and are received by antenna 17. Therefore, the present invention is not prone to tampering, false alarms or execution of commands which were not meant to be executed by an authorized user.

Figure 4:
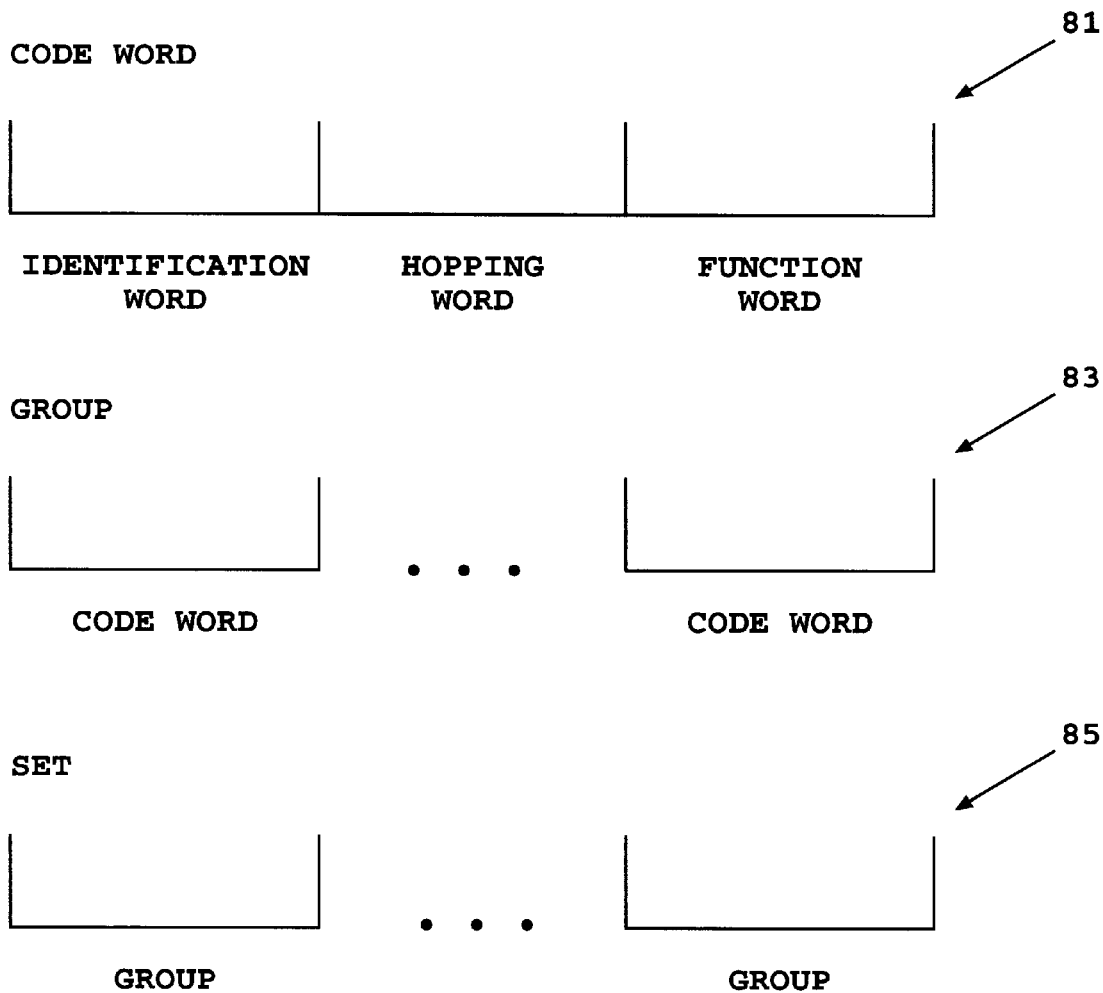
FIG. 4 is a graphical representation of a code word, a group and a set.

As illustrated in FIG. 4, code word 81 has an identification word, in some embodiments a hopping word and a command or function word, not necessarily in that order. The hopping word changes each time transmitter 1 is activated to confuse a potential thief. A group 83 consists of two or more code words 81 and a set 85 consists of one or more groups 83.

To provide for on-command remote control of system 25 through wireless transmitter 1, transmitter 1 must be programmed into system 25. To achieve this, system 25 employs a learn mode/routine. In the preferred embodiment, system 25 is placed in a learn mode (hereafter mode and routine are used interchangeably) when its power transitions from a power-down to a power-up state. This is achieved by initially connecting system 25 to its power supply or by disconnecting it from its power supply and reconnecting it to its power supply such as a car battery (not shown). In other embodiments learn mode is initiated by closing and opening a switch (not shown) attached to instant input 33 (positive or negative) after power-up or by activating instant input 33 while system 25 is being powered-up. A separate and independent program control switch (not shown) could also be used to place system 25 into the program mode. In the preferred embodiment, controller 23 provides audio notification of its learn mode by a siren sequence and/or by a visual notification such as a light signal and/or an LED signal in a predetermined sequence. Thereafter, the user or programmer is in position of activating wireless transmitter 1 to send its code word having the unique identification word therein to system 25. To program this identification word as an authorized identification word within system 25, user must place system 25 in the learn mode that starts a timer (not shown) of five (5) seconds (it could be any amount of time) during which the user must commence transmitting the code word a predetermined number of times by activating and deactivating switch 3 and the identification word must be successfully received and compared the same predetermined number of times by system 25. If controller 23 fails to recognize one of the transmitted code words or another recognizable code word is received, then a new set of transmissions must be performed and the identification words previously received by system 25 are not stored as authorized identification words.

More particularly, to program an authorized identification word, controller 23 must receive a set of groups of code words transmitted from the same transmitter 1. In the preferred embodiment, each time switch 3 is pressed, transmitter 1 sends a series of identical code words, one after the other and in a protocol sufficient to meet FCC regulations. To program a new authorized identification word, system 25 expects to receive at set of three groups (it could be any number) of identical code words to extract and store a new authorized identification word in EEPROM 21. Each group of code words comprises at least two code words (it could be any number) that are sent each time switch 3 is pressed. The successful receipt of a complete group, comprising two identical code words, by system 25 is acknowledged by an audio and/or visual feedback to the user. Further, three successive groups, which is the set, must be received before controller 23 extracts the identification word from the code words it received in the set, stores the identification word in EEPROM 21 and acknowledges receipt of the new authorized identification word via a distinct audio and/or visual signal as described earlier.

Figure 3:
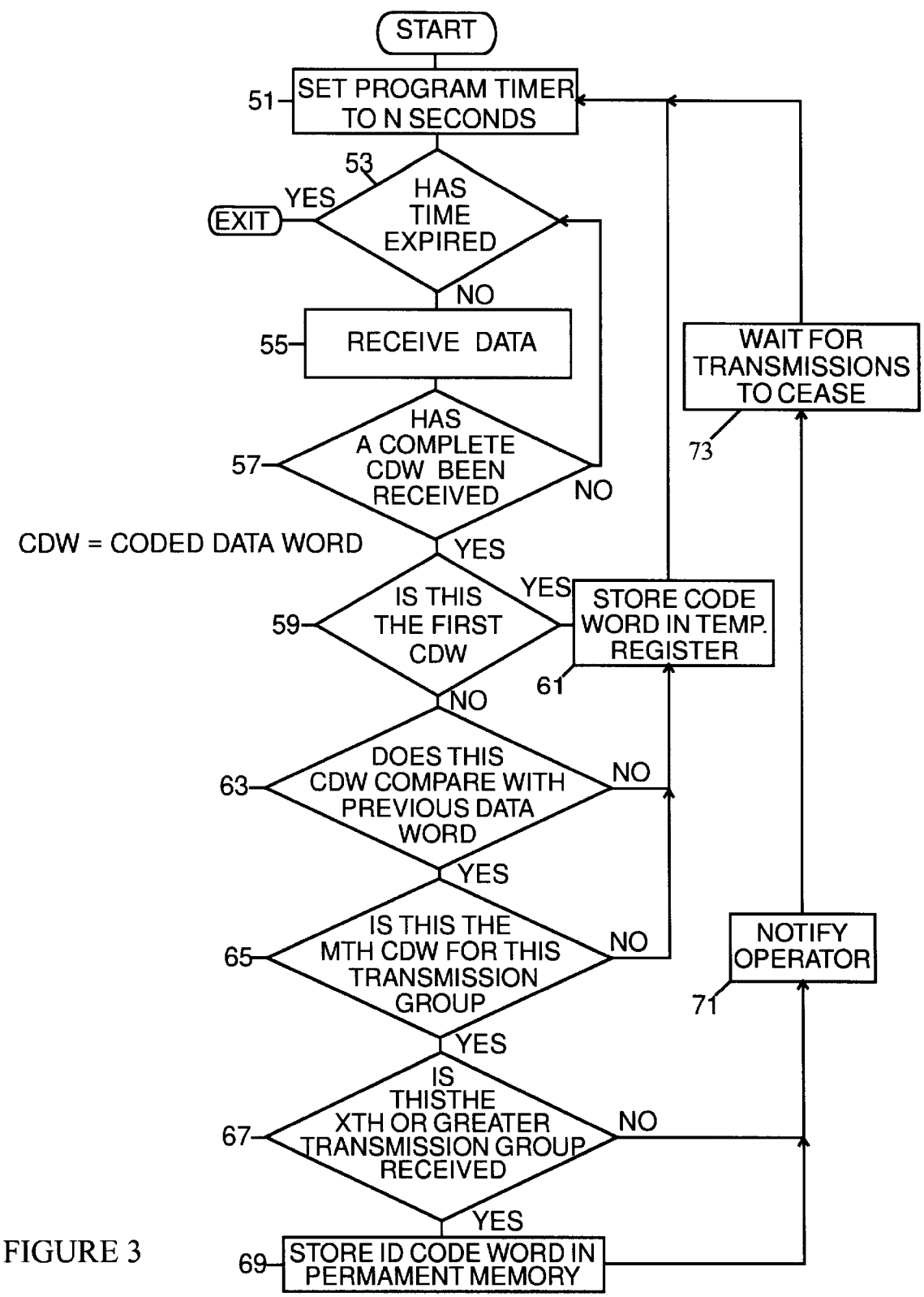
FIG. 3 is a flow chart of the system learn routine.

As shown in the flow chart of FIG. 3, to program a new authorized identification word in system 25, system 25 enters its learn mode. The learn mode is initiated as described above. Once initiated, a timer is set at 51 to N seconds, which in the preferred embodiment is five seconds. Controller 23 immediately checks, if the time expired at 53. It then continues to stay in a loop to collect data at 55; makes a determination if a complete code word was received at 57; and loops back to 53 to check if the time to receive a code word expired. If a complete code word is not received within N seconds, it exits the learn routine. If a complete code word is received at 57, controller 23 continues and checks at 59 if this is the first code word received. If it is, it stores it in temporary register 61 and loops back to 51 where the timer is reset to N seconds again and controller 23 continues to await and receive additional code words as just described.

If this was not the first code word received at 59, controller 23 compares it with the previously received code word at 63. If the two are not the same, the most recent code word is stored in temporary register 61; controller 23 loops back to 51 where the timer is again reset; controller 23 continues to wait for the next code word as described above; and the entire routine is effectively reset as it awaits a full set of identical code words. If, however, the two code words are the same at 63, controller 23, at 65, checks if this is the Mth identical code word received. M in the preferred embodiment has a value of two (2) and represents a group of code words. M could be any value. If it is not the Mth identical code word then controller 23 loops to 61 and 51 where it stores the code word in the temporary register and resets the timer to N seconds again.

If it is the Mth code word at 65, that means that a group of identical code words was received. Controller 23 then makes a determination at 67 if this is the final group of the set by checking if it is the Xth group. X in the preferred embodiment has a value of three, although it could be any number. If it is not the Xth group and therefore not a set, system loops to 71, 73 and back to 51 to reset the timer. At 71 it notifies the user via an audio and/or visual signal, such as a siren or horn chirp and/or light signal, that a group of code words was received. The user then must release switch 3 to stop transmission of code words. To sense release of switch 3, controller 23, at 73, monitors that the transmission of code words cease before it continues to 51. At 51 controller 23 again begins to look for new transmission of code words which the user initiates by pressing switch 3.

Controller 23 goes through the routine again to collect a subsequent group of code words. At 67, if it did not receive the Xth group it returns to look for the subsequent group as described above after notifying the operator at 71; waiting for transmissions to cease at 73; and waiting for transmissions to begin again starting with 51. If it is the Xth group comprising a set of code words at 67, controller 23 stores the identification word of the code word as a new authorized identification word in EEPROM 21 at 69. It then loops to 71 and notifies the operator via an audible and/or visual signal that a full set has been received and that transmitter 1 is now programmed as an authorized transmitter. This signal at 71 is preferably different than signals indicating receipt of a group. Controller 23 then waits for the transmission of code words to cease at 73 and loops to 51.

If after notification by controller 23 at 71 that transmitter 1 is programmed, the user continues to press switch 3 of the now authorized transmitter 1 again, controller 23 repeats the entire process again, but with one substantial difference. At 67, the group count exceeds X, therefore controller 23 proceeds to 69. Therefore, unless controller 23 exits at 53, each subsequent transmission of a group of code words from this transmitter will be recognized as a complete set. Controller 23 will store the identification word of the code word in EEPROM 21 at 69 and repeat the learn routine until it times out at 53. This provides system 25 with the ability to overwrite old authorized identification words with ease and expediency. According to this invention, the user/operator does not have to transmit a full set of code words requiring him/her to press and release switch X times. Instead, once transmitter 1 is programmed once via this routine and the learn routine does not time out, subsequent receipt of a group of code words from the same transmitter 1 require only one group, i.e. one press and release of switch 3, to program it in another EEPROM 21 location. This is a useful tool when a transmitter has been lost or stolen because one can overwrite old authorized identification words with ease.

Further, in the preferred embodiment of the invention, if any recognizable code words received during the learn mode at 63 are not identical to the previously received code words, controller 23 restarts the learn routine for the transmitter with the last received recognizable code word and continues to wait for a predetermined number of code words as described above to make a set of groups of identical code words. Accordingly, if the transmission received is from an extraneous transmitter, which is not intended to be programmed as an authorized transmitter, then controller 23 will effectively restart the learn routine upon receiving a code word from the unintended transmitter and then again restart it when it receives the intended transmitter 1 code word. It follows, therefore, that if the transmission received is from another transmitter being programmed into the system, then the previously received transmitter 1 code words are ignored and the procedure is started anew. Overall, system 25 must receive a set of X groups of the same code words before the identification word therein is programmed in EEPROM 21.

In an alternative embodiment of the invention (not shown), if any received identification words during the learn window are not identical to the rest of the received identification words, controller 23 exits the learn mode. Thereafter system 25 must be placed into the learn mode again to learn a new transmitter identification word.

As described above, in other embodiments of this invention, the learn mode may be activated by a certain sequence and/or combination of events. This embodiment requires that system 25 employ external sensors about the secured area, and its components, such as instant 33 input (positive or negative) and/or door sense or any other type of activity which provides an input signal to controller 23. Shock sensor 31 and current sensor 35 may not be desirable for this application because their inputs can not be maintained for any controlled period of time. In this embodiment, controller 23 enters its learn mode when a certain sequence of events takes place. For example, the learn mode is entered when system 25 is powered-up, a door is opened and ignition is on (additional inputs such as door and/or ignition, would be required for this capability of system 25). Once in the learn mode, identification word is learned as described above.

Outputs, light flash 37, siren 29, and/or LED 41, could be used to notify the operator of system 25 that controller 23 enters and exits the learn mode, and accepts transmitter 1 programming into system 25. Ground when armed 39 output is used to control external sensors and to provide a means to disable the vehicle or the starting of the vehicle while the system is armed. In the preferred embodiment at 71 a chirp and/or a light sequence is performed for every group of code words received by controller 23 and a separate audio and/or visual indication at 71 is performed when a set of groups is received and authorized identification word is programmed in memory 21.

In other systems, the code word and/or the function word and/or identification word changes from word to word and/or from transmission to transmission in an attempt to make the transmissions illusive and more secure. This technology is sometimes referred to as "rolling codes" or "hopping codes". It is in the scope of this invention to include within the meaning and scope of terms "code word", "identification word", "authorized identification word" and/ or "function word" changing words, where these words change from transmission to transmission. It is further within the scope of this invention to include within the term identical code word sequentially changing code words regardless of the format or algorithm that commands the change.

This invention can also be described as a method of achieving its objectives. Shown in the flow chart of FIG. 3, the first step in programming a new authorized identification word in system 25, is controller 23 entering its learn mode. The learn mode is initiated as described above. Once initiated, the next step is setting timer at 51 to N seconds, which in the preferred embodiment is five seconds. Next step is checking if the time expired at 53. Next step is for system continuing to stay in a loop to collect data at 55; determining if a complete code word was received at 57; and looping back to 53 and checking if the time to receive a code word expired. If a complete code word is not received within N seconds, controller 23 exits the learn routine. Next step, if a complete code word is received at 57, is controller 23 exiting this loop and checking at 59 if this is the first code word received. If it is, the next step is storing it in temporary register 61 and looping back to 51 where the timer is reset to N seconds again and controller 23 continuing waiting and receiving additional code words as just described.

If this was not the first code word received at 59, the next step is controller 23 comparing it with the previously received code word at 63. If the two are not the same, next step is storing the most recent code word in temporary register 61; looping back to 51 and resetting the timer; controller 23 waiting for the next code word as described above; and effectively resetting the entire routine, awaiting a full set of identical code words. If, however, the two code words are the same at 63, the next step is controller 23, at 65, checking if this is the Mth identical code word received. M in the preferred embodiment has a value of two (2) and represents a group of code words; although M could be any value. If it is not the Mth identical code word, then the next step is controller 23 looping to 61 and 51 and storing the code word in the temporary register and resetting the timer to N seconds.

If it is the Mth code word at 65, that means that a group of identical code words was received. The next step is controller 23 making a determination at 67 if this is the final group of the set by checking if it is the Xth group. X in the preferred embodiment has a value of three, although it could be any number. If it is not the Xth group and therefore not a set, the next step is system looping to 71, 73 and back to 51 resetting the timer. At 71 controller 23 notifies the user via an audio and/or visual signal, such as a siren or horn chirp and/or light signal, that a group of code words was received. The user then must release switch 3 to stop transmission of code words. To sense release of switch 3, controller 23, at 73, monitors that the transmission of code words cease before it continues to 51. At 51 controller 23 again looks for new transmission of code words which the user initiates by pressing switch 3.

The next step is for controller 23 again going through the routine and collecting a second group of code words. At 67, if it did not receive the Xth group, the next step is controller 23 returning and looking for the subsequent group as described above after notifying the operator at 71; waiting for transmissions to cease at 73; and waiting for transmissions to begin again starting at 51. If it is the xth group comprising a set of code words at 67, the next step is controller 23 storing the identification word of the code word as a new authorized identification word in EEPROM 21 at 69. The next step is controller 23 looping to 71 and notifying the operator via an audible and/or visual signal that a full set has been received and that transmitter 1 is now programmed as an authorized transmitter. This signal at 71 is preferably different than signals indicating receipt of a group. The next step is controller 23 waiting for the transmission of code words to cease at 73 and looping to 51.

If after notifying the operator at 71 that transmitter 1 is programmed, the user continues to press switch 3 of the now authorized transmitter 1 again, the next step is controller 23 repeating the entire process again, but with one substantial difference. At 67, the group count exceeds X, therefore controller 23 proceeds to 69. Therefore, unless controller 23 exits at 53, each subsequent transmission of a group of code words from this transmitter will be recognized as a complete set. The next step then is controller 23 storing the identification word of the code word in EEPROM 21 at 69 and repeating the steps of the learn routine until it times out at 53. This provides controller 23 with the ability to overwrite old authorized identification words with ease and expediency. According to this invention, the user/operator does not have to transmit a full set requiring him/her to press and release switch 3×times. Instead, once transmitter 1 is programmed once via this routine and the learn routine does not time out, subsequent receipt of a group of code words from the same transmitter 1 require only one group, i.e. one press and release of switch 3 to program it in another EEPROM 21 location. This is a useful tool when a transmitter has been lost or stolen because the operator/user can overwrite old authorized identification words with ease.

Further, in the preferred embodiment of the invention, if any recognizable code words received during the learn mode at 63 are not identical to the previously received code words, the next step is controller 23 restarting the learn routine for the transmitter with the last received recognizable code word and continuing to wait for a predetermined number of code words as described above to make a set of groups of identical code words. Accordingly, if the transmission received is from an extraneous transmitter, which is not intended to be programmed as an authorized transmitter, then controller 23 in its next step will effectively restart the learn routine upon receiving of the code word from the unintended transmitter and then again restarting it after receiving the intended transmitter 1 coded word. It follows, therefore, that if the transmission received is from another transmitter 1 being programmed into the system, then the previously received transmitter 1 code words are ignored and the procedure is started anew. Overall, system 25 must receive a set of X groups of the same code words before the identification word therein is programmed in EEPROM 21.

In other systems, the code word and/or the function word and/or identification word changes from word to word and/or from transmission to transmission in an attempt to make the transmissions illusive and more secure. This technology is sometimes referred to as "rolling codes" or "hopping codes". It is in the scope of this invention to include within the meaning and scope of terms "code word", "identification word", "authorized identification word" and/or "function word" changing words, where these words change from transmission to transmission. It is further within the scope of this invention to include within the term identical code word sequentially changing code words regardless of the format or algorithm which commands the change.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A system including a remote transmitter and a controller responsive thereto, said device comprising:
   a) a transmitter having at least one switch therein for generating and transmitting a signal encoded with a code word having at least one identification word;
   b) a controller including:
      (i) a receiver for receiving said signal; and,
      (ii) a decoder for decoding said code word from said signal;
   c) said controller responsive to a function word embedded in said code word only if said identification word is identical to at least one authorized identification word stored in a memory accessible to said controller; and
   d) a learn mode for programming a new identification word in said memory as said authorized identification word upon receipt of a first transmission of at least one group of code words and a second transmission of at least one code word transmitted from said transmitter and received by said controller at least one of said groups of code words having a plurality of said code words transmitted upon activation of said switch.

2. The system of claim 1 wherein said receiver must receive said code word from said transmitter within a predetermined amount of time.

3. The system of claim 1 wherein said identification word is programmed in said memory as said authorized identification word upon receipt of a set of said code words.

4. The system of claim 3 wherein said set comprises at least two said groups of said code words.

5. The system of claim 1 wherein said identification words of said code words are identical.

6. The system of claim 1 further comprising a temporary memory accessible to said controller for storage of said code word while said controller is in said learn mode.

7. The system of claim 1 further comprising an audio, visual free signal in response to receiving said group of said code words.

8. The system of claim 3 further comprising an audio, visual free signal in response to receiving said set of said code words.

9. The system of claim 2 wherein said controller exits said learn mode if it does not receive said code words within said predetermined amount of time.

10. The system of claim 1 wherein said learn mode is terminated upon receipt of two non identical code words.

11. The system of claim 2 wherein said controller resets said predetermined amount of time after receipt of said code word.

12. The system of claim 1 wherein said transmitter and said receiver each further comprise an antenna for transmission and receipt of said signal.

13. The system of claim 12 wherein said antenna is a wire.

14. The system of claim 12 wherein said antenna is collapsible.

15. The system of claim 12 wherein said antenna is a trace in a circuit board.

16. The system of claim 1 wherein said signal is pulse modulated.

17. The system of claim 1 wherein said signal is amplitude modulated.

18. The system of claim 1 wherein said learn mode is enabled by a switch.

19. The system of claim 1 wherein said learn mode is activated by removing and reapplying power to said controller.

20. The system of claim 1 wherein said learn mode is activated by sensing a predetermined sequence of triggers from at least one input about said vehicle.

21. The system of claim 3 wherein said identification word is programmed in said memory as said authorized identification word each time said group of code words having the same said identification word is received after receipt of said set of code words.

22. The system of claim 1 further comprising a visual, audio free signal in response to receiving each said group of said code words.

23. The system of claim 1 further comprising a visual and audio signal in response to receiving said set of said code words.

24. The system of claim 3 further comprising a visual, audio free signal in response to receiving said set of said code words.

25. The system of claim 3 further comprising a visual and audio signal in response to receiving said set of said code words.

26. A method of programming an authorized identification word in a device having a transmitter and a controller, the method comprising:

a) placing said controller in a learn mode;

b) transmitting a group of code words having an identification word therein from said transmitter to said controller by pressing at least one switch of said remote transmitter that the user intends to program as an authorized transmitter in said controller;

c) continuing to press said switch until said controller receives at least one said group of said code words;

d) releasing said switch and repeating said steps of pressing said switch and transmitting said group of said code words at least one more time until said controller receives a set of said groups of said code words; and e) storing said identification word as an authorized identification word in a memory accessible to said controller.

27. The method of claim 26 further comprising the step of notifing the user with an audio, visual free signal after receipt of said group of said code words.

28. The method of claim 26 further comprising the step of notifying the user with an audio and visual signal after receipt of said set of said groups of said code words.

29. The method of claim 26 further comprising the step of exiting said learn mode if said controller does not receive at least one said code word within said predetermined amount of time.

30. The method of claim 26 further comprising the steps of:

a) initiating a first predetermined amount of time after entering said learn mode;

b) exiting said learn mode if said code words are not received within said first predetermined amount of time;

c) initiating a second predetermined amount of time after each receipt of said code word; and d) exiting said learn mode if at least one said code word is not received within said second predetermined amount of time.

31. The method of claim 26 further comprising the steps of:

a) storing the received code word in a temporary memory;

b) comparing subsequently received at least one code word to said stored code word and if said code words are not identical, storing said subsequently received code word in said temporary memory;

c) receiving said set of said code words identical to said code word stored in said temporary memory; and d) decoding said identification word from said code word and storing said identification word as said authorized identification word in said memory accessible to said controller.

32. The method of claim 26 further comprising the step of programming at least two authorized identification words for control of said controller.

33. The method of claim 26 wherein said learn mode is initiated by applying a signal to said controller.

34. The method of claim 26 wherein said learn mode is initiated by disconnecting and reconnecting said controller and its power source.

35. The method of claim 26 further comprising the step of programming at least two authorized identification words in said memory.

36. The method of claim 26 further comprising the steps of programming said authorized identification word at least two times as additional authorized identification words, the steps comprising:

a) pressing said switch and transmitting at least one additional group of said code words after said notification from said controller that said set of said groups of said code words was received;

b) extracting said identification word from said code words of said additional group of said code words; and c) programming said identification word in said memory.

37. The method of claim 22 further including the step of notifying the user with a visual, audio free signal after receipt of said group of said code words.

38. A signal for programming an authorized identification word of a transmitter in a remote controller, said signal comprising:

a group of code words comprising at least two code words, each code word includes at least one identification word, the group followed by at least one more code word, said signal transmitted from said transmitter to said controller; when the controller is in a learn mode said identification word of said code word is stored in a memory accessible to said controller as said authorized identification word upon receiving said signal.

39. The signal of claim 38 wherein said controller issues a signal generating an audio, visual free signal to notify the user that said group of said code words was received by said controller.

40. The signal of claim 38 wherein said controller issues a signal generating an audio free, visual signal to notify the user that said group of said code words was received by said controller.

41. The signal of claim 38 wherein said controller issues a signal generating an audio and visual signal to notify the user that said group of said code words was received by said controller.

42. The signal of claim 38 wherein said learn mode terminates if said controller does not receive said code words within a predetermined amount of time.

43. The signal of claim 38 wherein said controller further comprises:

a) a timer accessible to said controller, said timer set for a first predetermined amount of time after entering into said learn mode;

b) said learn mode terminating if at least one said code word is not received within said first predetermined amount of time;

c) said timer resetting for a second predetermined amount of time after each receipt of said code word; and d) said learn mode terminating if said code word is not received within said second predetermined amount of time.

44. The signal of claim 38 wherein said controller has access to a temporary memory for storage of said code word.

45. The signal of claim 38 wherein said learn mode is terminated upon receipt of at least two non identical code words.

46. The signal of claim 43 wherein said timer is reset upon at least one receipt of said code word.

47. The signal of claim 38 wherein said signal is pulse modulated.

48. The signal of claim 38 wherein said signal is amplitude modulated.

49. The signal of claim 38 wherein said learn mode is initiated by applying a signal to said controller.

50. The signal of claim 38 wherein said learn mode is initiated by disconnecting and reconnecting said controller and its power source.

* * * * *